(12) United States Patent
Barbeau

(10) Patent No.: US 7,424,282 B2
(45) Date of Patent: Sep. 9, 2008

(54) METHOD AND SYSTEM FOR DELIVERING PHOTOS TO CALLED DESTINATIONS

(75) Inventor: Pierre Barbeau, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 767 days.

(21) Appl. No.: 10/945,470

(22) Filed: Sep. 20, 2004

(65) Prior Publication Data

US 2006/0044407 A1 Mar. 2, 2006

Related U.S. Application Data

(60) Provisional application No. 60/604,778, filed on Aug. 26, 2004.

(51) Int. Cl.
*H04M 11/04* (2006.01)
*H04N 5/232* (2006.01)

(52) U.S. Cl. .................... 455/404.1; 348/211.1

(58) Field of Classification Search ............. 348/211.2; 455/404.1, 404.2, 412.1
See application file for complete search history.

(56) References Cited

U.S. PATENT DOCUMENTS

| | | | | |
|---|---|---|---|---|
| 5,327,144 A | 7/1994 | Stilp et al. | ................ | 342/387 |
| 5,386,117 A | 1/1995 | Piety et al. | ................ | 250/330 |
| 5,402,171 A | 3/1995 | Tagami et al. | ............. | 348/219.1 |
| 5,748,484 A | 5/1998 | Cannon et al. | ......... | 364/479.03 |
| 5,806,005 A | 9/1998 | Hull et al. | ................ | 455/566 |
| 5,943,603 A | 8/1999 | Parulski et al. | ............. | 725/133 |
| 6,282,362 B1 | 8/2001 | Murphy et al. | ................ | 386/46 |
| 6,344,853 B1 | 2/2002 | Knight | ................ | 345/629 |
| 6,359,837 B1 | 3/2002 | Tsukamoto | ................ | 368/10 |
| 6,396,537 B1 | 5/2002 | Squilla et al. | ................ | 348/239 |
| 6,449,485 B1 | 9/2002 | Anzil | ................ | 455/456.1 |
| 6,507,362 B1 | 1/2003 | Akerib | ................ | 725/109 |
| 6,573,927 B2 | 6/2003 | Parulski et al. | ................ | 348/32 |
| 6,636,259 B1 | 10/2003 | Anderson et al. | ......... | 348/211.3 |
| 6,657,661 B1 | 12/2003 | Cazier | ................ | 348/231.2 |
| 6,741,864 B2 | 5/2004 | Wilcock et al. | ......... | 455/456.1 |
| 6,833,861 B2 | 12/2004 | Matsumoto et al. | ...... | 348/207.2 |

(Continued)

FOREIGN PATENT DOCUMENTS

DE 199 13 019 A 1 2/2001

(Continued)

OTHER PUBLICATIONS

Audio Device, Covert Tracking System, http://www.spyshopusa.com/Tracking_S.htm, printed from the World Wide Web on Apr. 1, 2002.

(Continued)

*Primary Examiner*—Lin Ye
*Assistant Examiner*—Jason Whipkey

(57) ABSTRACT

A method and system for conveying a digital image to an assistance center, such as an emergency-assistance center (e.g., 911 center). A camera phone captures an image and sends the image to a network server, and the network server stores the image in correlation with an identifier, such as an identifier of the camera phone or an identifier of an assistance call placed by the camera phone. The assistance center then queries the network server to obtain a photo correlated with the identifier. And the network server responsively provides the photo to the assistance center.

18 Claims, 4 Drawing Sheets

U.S. PATENT DOCUMENTS

| | | | |
|---|---|---|---|
| 6,853,461 B1 | 2/2005 | Shiimori | 358/1.15 |
| 6,862,045 B2 | 3/2005 | Morimoto et al. | 348/515 |
| 6,911,992 B2 | 6/2005 | Bronstein et al. | 345/629 |
| 6,912,398 B1 | 6/2005 | Domnitz | 455/461 |
| 6,914,626 B2 | 7/2005 | Squibbs | 348/231.3 |
| 6,941,276 B2 | 9/2005 | Haeberli | 705/26 |
| 7,340,246 B1 * | 3/2008 | Kanerva et al. | 455/415 |
| 2002/0054224 A1 | 5/2002 | Wasula et al. | 348/232 |
| 2002/0137528 A1 * | 9/2002 | Fraccaroli | 455/404 |
| 2003/0137422 A1 | 7/2003 | Nishibori | 340/573.1 |
| 2003/0202101 A1 | 10/2003 | Monroe et al. | 348/156 |
| 2003/0206316 A1 | 11/2003 | Anderson et al. | 358/1.18 |
| 2004/0015191 A1 | 1/2004 | Otman et al. | 607/5 |
| 2004/0189517 A1 * | 9/2004 | Pande et al. | 342/357.06 |
| 2005/0084084 A1 * | 4/2005 | Cook et al. | 379/142.01 |
| 2005/0091277 A1 * | 4/2005 | Desman | 707/104.1 |
| 2005/0134691 A1 * | 6/2005 | Cox | 348/207.99 |
| 2005/0277421 A1 * | 12/2005 | Ng | 455/417 |

FOREIGN PATENT DOCUMENTS

| | | |
|---|---|---|
| JP | 2003174511 A * | 6/2003 |
| WO | WO 00/75859 | 12/2000 |
| WO | WO 01/86511 A2 | 11/2001 |

OTHER PUBLICATIONS

Technical Metadata for Digital Still Images—National Information Standards Organization (NISO), http://www.niso.org/committees/committee_au.html, printed from the World Wide Web on Apr. 25, 2002.

Portelligent, Epson Location Organizer with Camera & GPS Performance and Design Analysis, Report #140-991020-1b, 2000.

Harvard University Library: Digital Repository Service (DRS), "DRS Documentation—Administrative Metadata for Digital Still Images," v.1.2, Feb. 20, 2002.

Cat-Photo Standard 2.0 Tags, Cat-Photo Information, http://www.cat-photo.sourceforge.net/standard/tags.html, printed from the World Wide Web on Apr. 23, 2002.

Trimble Navigation Ltd.—GPS Software—ODELCO, Media Mapper, http://www.odelco.com/TRIMBLE/mmapper.htm, printed from the World Wide Web on Apr. 1, 2002.

"Datum Unveils Breakthrough Timing Technology for Telecommunications, Enterprise and OEM Applications," Press Release dated Feb. 8, 1999.

EOM Archives, http://www.eomonline.com/Common/Archives/November%2098/g2.htm, printed from the World Wide Web on Apr. 2, 2002.

EndRun Technologies, CDMA Timing Technology: No Antenna Hassle, http://www.endruntechnologies.com/cdma.htm, printed from the World Wide Web on Feb. 19, 2002, reprinted in full on Mar. 6, 2003.

EndRun Technologies, "Praecis Ce—OEM Time & Frequency Engine," printed on Apr. 4, 2002.

"It's a camera, a PDA, a phone! It's Origami!," http://www.nwfusion.com/columnists/2001/1126cooltools.html, printed from the World Wide Web on Apr. 1, 2002.

IBM, "IBM 340 MB Microdrive—Transforming Storage Technology," 1998.

Digital Imaging Group, Inc., "DIG35 Specification—Metadata for Digital Images," Version 1, Aug. 30, 2000.

Digital Imaging Group, Inc. "DIG35 Specification—Metadata for Digital Images," Version 1.1 Working Draft, Apr. 16, 2001.

I3A-DIG35, "Metadata Standards a Smarter Way to Look at Digital Images," http://www.i3a.org/l_dig35.html, printed from the World Wide Web on Apr. 29, 2002.

Overview, GPS Photo Link, http://www.geospatialexperts.com/gpl/help/overview.html, printed from the World Wide Web on Apr. 29, 2002.

Image Archive, http://ocean.ucc.ie/00/hanrahag/minipro/html, printed from the World Wide Web on Apr. 29, 2002.

Microsoft Windows Platform Development, "MetaData in Image Files and GDI+," http://www.microsoft.com/hwdev/tech/display/GDIplus_Metadata.asp, printed from the World Wide Web on Apr. 29, 2002.

NISO Draft Standard, "Data Dictionary—Technical Metadata for Digital Still Images," Working draft, 1.0, Jul. 5, 2000.

Praecis Ce, OEM Time & Frequency Engine, EndRun Technologies, Nov. 14, 2000, pp. 1-2.

JC Labs, Inc.—HSC-500 x2 Camera, http://www.jclabs.com/hsc-500.html, printed from the World Wide Web on Feb. 25, 2002.

Meteor-II/MC, http://www.fabrimex.ch/meteor-i1.htm, printed from the World Wide Web on Feb. 25, 2002.

EndRun Technologies—Products—CDMA Technology, http:www.endruntechnologies.com/cdma.htm, printed from the World Wide Web on Aug. 8, 2002.

EndRun Technologies; Benefits of GPS vs. CDMA, http://www.endruntechnologies.com/gps-cdma.htm, printed from the World Wide Web on Jan. 18, 2002.

Point Grey Research, Dragonfly, IEEE-1394 Digital Camera, printed from the World Wide Web on Sep. 5, 2002.

Xeni Jardin, "Phonecam Nation." (Document recites it was posted on Jun. 10, 2003. Document was printed from the World Wide Web.).

TheKansasCityChannel.com, "Teen Uses Camera Phone to Thwart Apparent Abduction." (Document recites it was posted on Aug. 1, 2003. Document was printed from the World Wide Web.).

"Camera Phone Hang-up." (Document was posted on the World Wide Web at least as early as Dec. 23, 2003. Document was printed from the World Wide Web.).

"What to do when you're in an Accident." (Document was posted on the World Wide Web at least as early as Feb. 18, 2004. Document was printed from the World Wide Web.).

Symmetricom - Symmetricom's breakthrough clock technology uses CDMA signals for timing the network edge, http://www.symmetricom.com/news/020899.html, printed from the World Wide Web on Aug. 8, 2002.

* cited by examiner

METHOD AND SYSTEM FOR DELIVERING PHOTOS TO CALLED DESTINATIONS

BACKGROUND OF THE INVENTION

1. Field of the Invention

The present invention relates to digital photography and, more particularly, to delivery of digital images to assistance centers such as emergency-assistance centers.

2. Description of Related Art

The art and popularity of digital photography has grown significantly over recent years. As a general matter, digital photography is very similar to conventional film-based photography, except that photographs taken with a digital camera are stored as digital files rather than being recorded on film. Digital photography thereby provides users with immediate access to photographs without the need for film developing. Further, digital photography allows for easy communication and sharing of photographs, though a computer network for instance.

One application of digital photography that is gaining very widespread acceptance is camera phone technology. As is known in the art, a camera phone is a combination cell phone/digital camera. More specifically, a camera phone typically includes (i) cell phone components that allow a user to engage in wireless voice and data communications and (ii) digital camera components that allow a user to capture digital images and store the images in digital image files.

One of the great advantages of most camera phones is that they allow a user to capture a digital image and then wirelessly transmit the image virtually anywhere in the world, such as to family or friends. To do this in a usual arrangement, a user of the camera phone takes a picture and then selects or enters a destination address, such as an e-mail address or a phone number of another camera phone. The camera phone then transmits the image to the destination address, typically by sending the image to a photo server that then forwards the image to the designated address.

Camera phones can also serve a useful security function. If a user has a camera phone at a crime scene or other emergency scene, for instance, the user can take a picture of the scene and then send the image to police or other authorities. As described in U.S. patent application Ser. No. 09/815,738, filed on Mar. 23, 2001 (published as US 2002/0137528 A1), for example, a user could engage a special actuation button on the camera phone that would cause the camera phone to (i) take a picture (ii) initiate a "911" call to an emergency assistance center, and (iii) transmit the picture within the call to the emergency assistance center.

SUMMARY

The present invention provides an improved method and system for delivery of emergency-scene photos from a camera phone to an emergency assistance center. According to an exemplary embodiment of the invention, a camera phone will send an emergency-scene photo to a network server, and the network server will store the photo as an emergency-photo correlated with an identifier (such as a camera phone identifier or an emergency call identifier). At some point thereafter, either during set up of an emergency assistance call from the camera phone, or during or after the call, the emergency assistance center will then query the network server to determine whether any applicable emergency-photo(s) correlated with the identifier are available. The network server will then respond by providing the emergency assistance center with the emergency-photo previously received from the camera phone.

More generally, the invention may take the form of a method that involves (i) receiving into a network server an image captured by a camera phone, (ii) storing the image at the network server in correlation with an identifier, (iii) during setup of a call from the camera phone to an assistance center, providing the identifier to the assistance center, (iv) receiving into the network server from the assistance center a request specifying the identifier, (v) using the identifier specified by the request as a basis to retrieve the image, and (vi) conveying the image in a response from the network server to the assistance center.

In one scenario, the assistance center can be an emergency assistance center, such as a 911 public safety answering point (PSAP), and the identifier could be an identifier of a call to the emergency assistance center or an identifier of the camera phone placing the call. The assistance center could take other forms as well, such as a customer service center for instance. Further, the network server could reside in a telecom carrier's network or elsewhere and could include one or more computers with data storage for holding the image in correlation with the identifier. In this regard, the entity of the network server that receives the image may or may not be the same entity of the network server that actually stores the image. For instance, an interface computer may receive the image and pass it to a storage computer, which may then store the image.

In addition, the function of receiving the image into the network server could occur at various times, such as (i) before the camera phone initiates the call to the assistance center or (ii) during setup of the call from the camera phone to the assistance center. In this regard, the function could involve receiving the image delivered from the camera phone to an address assigned to the network server, such as an Internet Protocol (IP) address, an e-mail address, a Universal Resource Identifier (URI) such as a URL, or a Session Initiation Protocol (SIP) address. Alternatively or additionally, the function could involve receiving the image from a photo server to which the camera phone transmitted the image. Further, if the function occurs during setup of the call from the camera phone to the assistance center, the function could involve (i) receiving into the network server a signal indicative of the call being set up and (ii) responsively sending from the network server to the camera phone a request for the image, in response to which the camera phone could provide the image to the network server.

The function of providing the identifier to the assistance center during setup of the call could also take various forms. For instance, it could involve (i) detecting setup of the call at a switch, (ii) responsively sending a signaling message from the switch to the network server, (iii) receiving at the switch a response that provides the identifier, and (iv) the switch sending a call setup message that carries the identifier. Alternatively, in a scenario where the identifier comprises a directory number of the camera phone, the function of providing the identifier to the assistance center during call setup could involve delivering the directory number to the assistance center as automatic-number-identification (caller-ID) information.

The function of receiving into the network server the request from the assistance center can also occur during setup of the call from the camera phone to the assistance center. For instance, when the assistance center receives a call setup message that carries the identifier or otherwise allows the assistance center to determine the identifier, the assistance center can send the request to the network server in an effort to retrieve any applicable image. Alternatively or additionally, the function of receiving into the network server the request from the assistance center could occur after initiation of the call, whether during the call or even possibly sometime after the call has ended.

Further, after conveying the image from the network server to the assistance center, the invention may further involve (i) receiving into the network server a subsequent image captured by the camera phone, (ii) storing the subsequent image at the network server in correlation with the identifier, (iii) receiving into the network server a subsequent request from the assistance center to obtain at least one image correlated with the identifier, and (iv) conveying the subsequent image in a response from the network server to the assistance center.

Yet further, the image that the network server receives can be represented by data in a digital image file. Thus, the network server can receive the image by receiving the digital image file, and the network server can convey the image to the assistance center by conveying the digital image file to the assistance center.

In an exemplary embodiment, the digital image file may further contain characterizing-metadata, such as (i) data indicating where the image was captured, (ii) data indicating when the image was captured, (iii) data indicating a location from which the image was transmitted, such as a location of the camera phone at the time it sent the image into the network, and (iv) data indicating a time when the image was transmitted, for instance.

The invention could then further involve using the characterizing-metadata as a basis to decide whether to send the image form the network server to the assistance center. For instance, the request from the assistance center could be restricted to ask for one or more images whose characterizing-metadata meets one or more criteria. Or the network server could be arranged to return images only if they have characterizing-metadata meeting certain criteria.

In another respect, the invention may take the form of a system, which could include a processor (i.e., one or more processors), data storage, and program instructions stored in the data storage and executable by the processor to carry out various functions such (i) receiving an image captured by a camera phone, (ii) storing the image in the data storage, in correlation with an identifier, (iii) during setup of a call from the camera phone to an assistance center, receiving from the assistance center a request specifying the identifier, (iv) using the identifier specified by the request as a basis to retrieve the image from the data storage, and (v) sending the image in a response to the assistance center. Similarly, the invention may take the form of a machine readable medium, such as a hard drive, memory device, disc, tape, or other medium, containing machine language instructions that could be read and executed by a processor to carry out these functions.

In still another respect, the invention could take the form of a method that involves the functions of (i) capturing an image into a camera phone, (ii) conveying the image from the camera phone to a network server, (iii) storing the image at the network server in correlation with an identifier, (iv) placing a call from the camera phone to an assistance center, (v) providing the identifier to the assistance center during setup of the call, (vi) conveying a request from the assistance center to the network server to obtain the image, based on the identifier, and (vii) conveying the image in a response from the network server to the assistance center.

In this regard, the function of conveying the image from the camera phone to the network server could occur before placing the call from the camera phone to the assistance center, during setup of the call, during the call itself, or after the call has ended. Similarly, the function of the assistance center querying the network server to obtain the image, based on the identifier, could occur during setup of the call, during the call, or after the call as well.

These as well as other aspects and advantages will become more readily apparent to those of ordinary skill in the art by reading the following detailed description with reference where appropriate to the accompanying drawings. Further, it should be understood that the embodiments described in this summary are intended to be merely examples and are not intended to limit the scope of the invention, which is defined by the claims.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
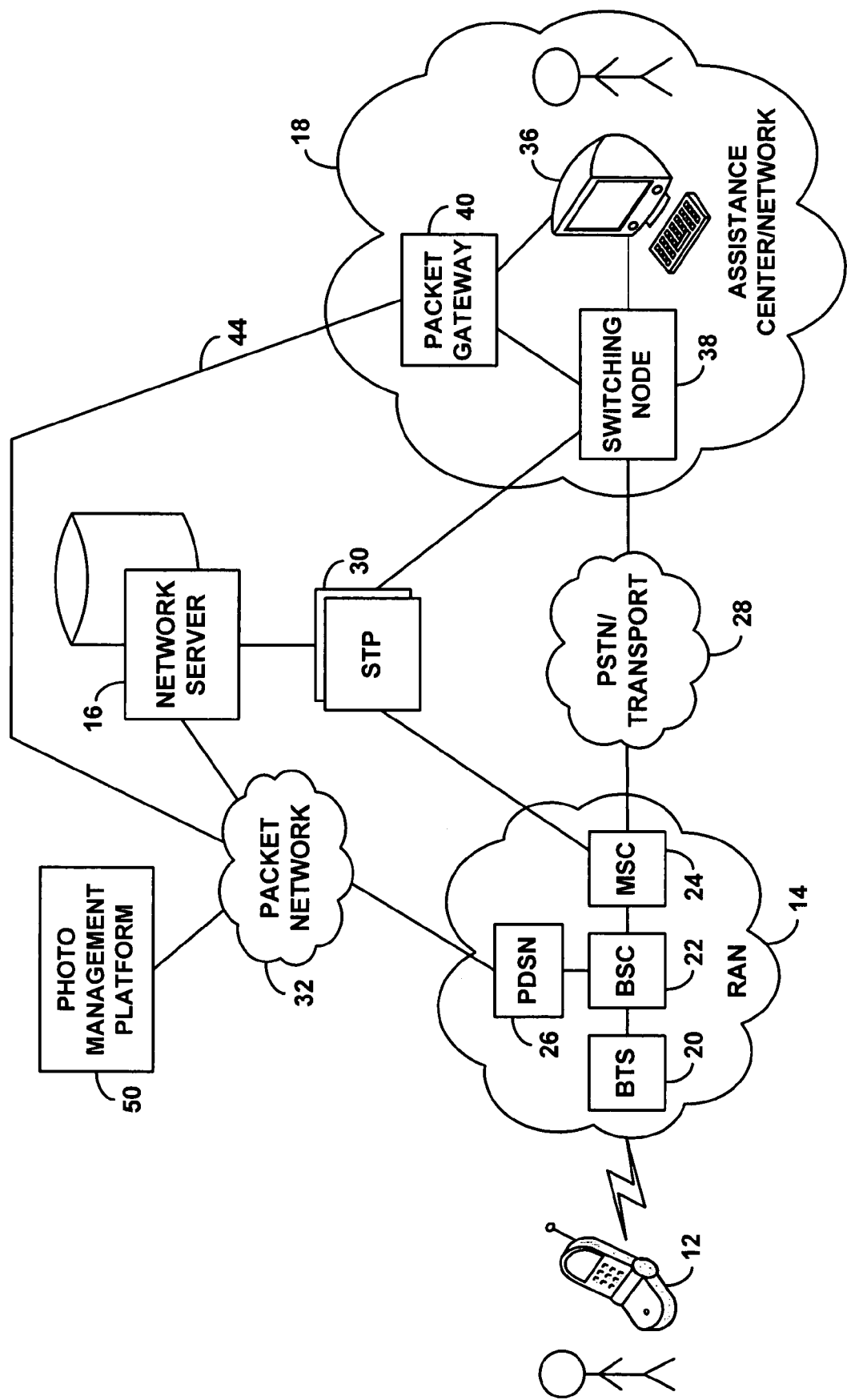
FIG. 1 is a simplified block diagram of a network in which the exemplary embodiment can be implemented.

Referring to the drawings, FIG. 1 is a simplified block diagram depicting a network arrangement in which an exemplary embodiment of the invention can be implemented. As shown in the figure, the network arrangement includes a camera phone 12, a radio access network (RAN) 14, a network server 16, and an assistance center 18, among other entities.

In this example arrangement, the RAN is shown to include a base transceiver station (BTS) 20, which is coupled with a base station controller (BSC) 22, which is coupled in turn with a mobile switching center (MSC) 24 and a packet data serving node (PDSN) 26. The MSC functions generally to control the RAN and also sits as a switching node on the public switched telephone network (PSTN) 28. As such, the MSC has a bearer/transport connection with the PSTN and is further coupled with a signaling network 30, such as a Signaling System #7 (SS7) network made up of one or more signal transfer points (STPs). The PDSN functions as a gateway to a packet-switched network 32, such as a telecom carrier's private packet network and/or the Internet, which may carry data according to the well known Internet Protocol (IP).

Communications between the RAN and the camera phone pass over an air interface 34 between a BTS antenna and a camera phone antenna. The communications can comply with any of a variety of protocols, such as CDMA, TDMA, AMPS, GPRS/GSM, 802.11, BLUETOOTH, or others, provided that the RAN and camera phone are both adapted to communicate according to the protocol.

The camera phone is preferably equipped to place voice calls and engage in packet-data communication via the RAN. The way the camera phone performs these functions can vary from implementation to implementation, depending on the arrangement of the RAN and on other factors.

By way of example, to place a voice call, the camera phone may transmit an IS-41 call origination message over an air interface access channel to the RAN, providing the RAN with dialed digits, i.e., a called phone number. The MSC may then receive that origination message and responsively (i) direct the BSC to assign an air interface traffic channel over which the camera phone can communicate and (ii) send a call setup message, such as an ISUP IAM message, into the signaling network in an effort to set up a call path to a switch serving the called party. (Alternatively, if the MSC serves the called party, the MSC may page the called party, in an effort to set up the call.) Upon successful setup of the call path, the MSC may then connect the call through to the called party. In performing this function, the MSC will typically the calling telephone number, i.e., the directory number of the camera phone, in its call setup signaling so that the called telephone can receive the calling number through conventional caller-ID procedures.

To engage in packet-data communication, the camera phone may transmit an IS-41 packet-data origination message over an air interface access channel to the RAN. Upon receipt of the origination message, the MSC may then (i) instruct the BSC to assign an air interface traffic channel over which the camera phone can communicate and (ii) signal to the PDSN, to facilitate setup of a packet-data connectivity. The PDSN and camera phone may then negotiate with each other to establish a data link, such as a point-to-point protocol (PPP) session for instance, and the PDSN or another entity may assign a simple-IP or mobile-IP address to the camera phone for the camera phone to use when engaging in packet-data communications. The camera phone may then send and receive packet-data communications with other nodes on the packet-switched network 32.

As further shown in FIG. 1, network server 16 may be coupled with both packet-switched network 32 and signaling network 30 and may be adapted to communicate over both of these networks. For instance, network server 16 may include a packet-data network interface module (such as an Ethernet network interface card (NIC)) that allows the network server to engage in IP communications on packet-switched network 32, and network server 16 may also include an SS7 interface that allows the network server to engage in SS7 communications on signaling network 30. Through the packet-switched network 32, the network server may thus communicate with camera phone 12, and, through the signaling network 30, the network server may communicate with RAN 14, such as MSC 24.

Assistance center 18 can similarly take various forms. In FIG. 1, the assistance center is shown as a network comprising multiple interconnected entities, but the assistance center could just as well be a simple computer telephony device. In the example arrangement shown, the assistance center 18 includes an operator terminal 36, which is communicatively linked with a telephony switching node 38 and also with a packet-gateway 40. The telephony switching node 38, like MSC 14, preferably functions as a switching node on PSTN 28 and thus has trunk connections as well as connections with signaling network 30. The packet-gateway 40, like PDSN 26, preferably provides connectivity with a packet-switched network or other link 42, which provides a communication path between the packet-gateway 40 and network server 16. Packet link 42 may also be part of packet-switched network 32 or packet gateway 40 may be linked thereto by a suitable connection 44.

Thus, assistance center can receive a call placed via PSTN 28, such as a voice call from camera phone 12. By way of example, when camera phone 12 places a call to the assistance center, MSC 14 may engage in call setup signaling (such as ISUP signaling) with telephony switching node 38, via signaling network 30, and, upon successful setup of the call, MSC 14 may connect the call through PSTN 28 to switching node 38, and in turn to operator terminal 36. When the call is placed, switching node 38 may conventionally receive a caller-ID indication of the calling phone number (the phone number of camera phone 12) and may pass that to operator terminal 36 for display to an operator or for other purposes. As another example, when the camera phone places a call to the assistance center, the camera phone may engage in packet-based call setup signaling (such as SIP signaling) to establish a packet-based voice call, via packet-gateway 40, with the operator terminal 36. Other examples are possible as well.

As further shown in FIG. 1, the example network arrangement may include a photo management platform 50, which may sit as a node on packet-switched network 32 for instance. The photo management platform 50 could comprise one or more servers equipped to receive and manage digital image files provided from wirelessly equipped digital cameras and/or from other devices. For instance, the photo management platform 50 could receive from a camera phone (via a packet-data communication, such as HTTP or other communication) a digital image file, together with a destination identifier (such as an e-mail address, IP address, SIP address, or other network address to which the photo management platform 50 should forward the image file. The photo management platform 50 may then forward the image file to the designated destination. As a specific example, for instance, camera phone 12 might programmatically send a digital image file to a predefined network address of the photo management platform 50 together with a network address of network server 16, and photo management platform 50 may responsively forward the image file to the network server.

Conventionally, an MSC can be programmed with advanced intelligent network (AIN) triggers, which cause the MSC to signal to a designated network entity when the MSC is faced with a request to set up a call from a given device. Some such triggers may be keyed to the called number. For instance, the MSC may have a profile record (e.g., visitor location register (VLR)) that indicates that the MSC should signal to a particular network entity for call processing guidance whenever the MSC receives a request from a given directory number to place a call, regardless of the called number. Other triggers might be keyed to the called number. For instance, the MSC may be programmed with logic that causes the MSC to signal to a particular network entity whenever it is faced with a request to place a call to a given phone number, such as to the number "911" for instance.

The signaling message that the MSC sends to the designated network entity may be an IS-41 "Origination Request" (ORREQ) message, which carries an indication of the calling and called number, among other parameters. The network entity that receives the signaling message may then apply service logic to determine how the MSC should handle the call request and may then send a response message, such as an ORREQ return result (orreq_rr) to the MSC, providing the MSC with one or more parameters indicating how the MSC should handle the call request.

In the exemplary embodiment, MSC 14 may include program logic that causes it to signal to the network server 16 whenever a call to "911" or another designated number is placed. The network server 16 would thus receive an indication that the call is being placed, and the network server could respond accordingly, as will be described more below, to facilitate conveying an image to the called party.

Figure 2:
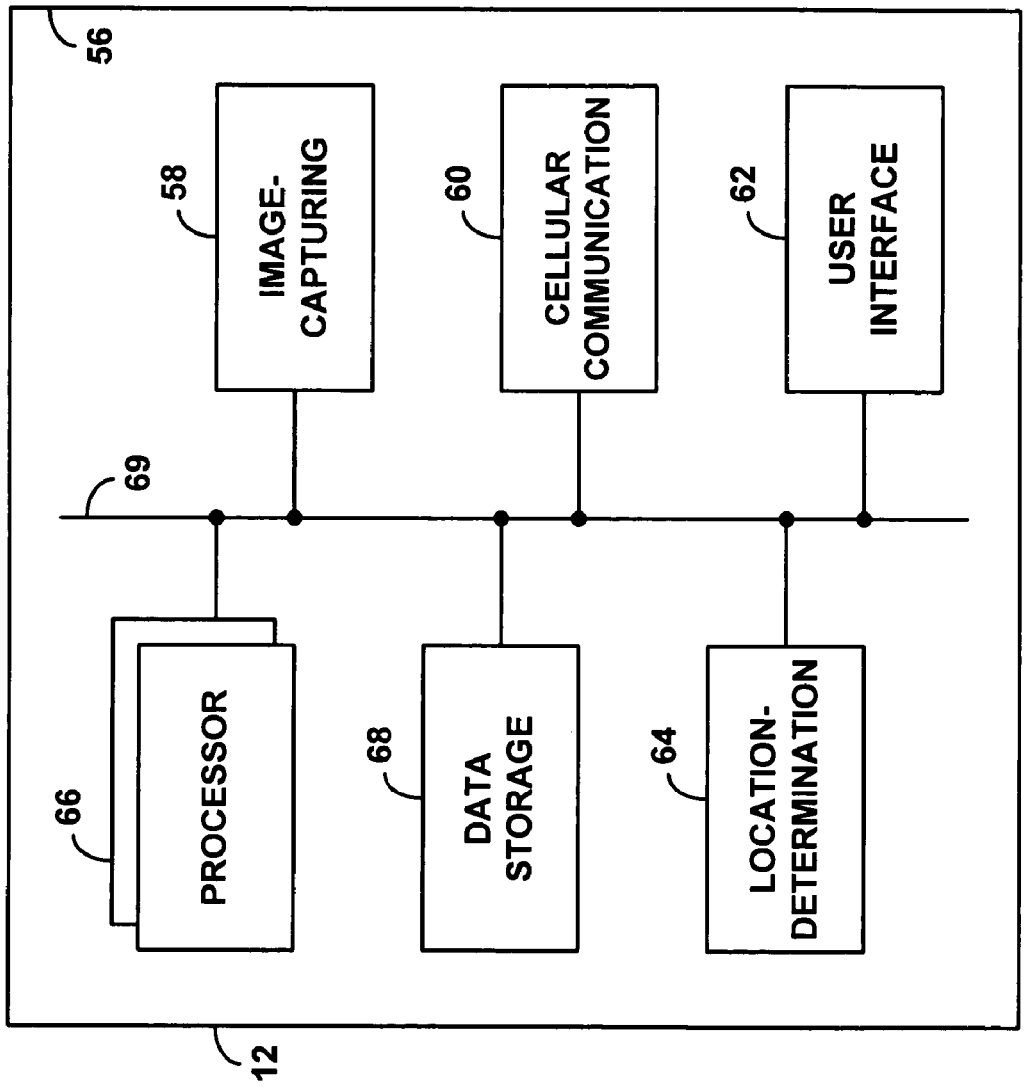
FIG. 2 is a simplified block diagram of a camera phone arranged to operate within the exemplary embodiment.

FIG. 2 is a functional block diagram of an example camera phone. As shown, the example camera phone may include, within a camera housing 56, an image-capturing block 58, a cellular-communication block 60, a user interface block 62, a location-determination block 64, a processor 66 (i.e., one or more processors) and data storage 68, all of which may work together and may be communicatively linked together by a system bus or other mechanism 69.

These components may permanently reside in the camera phone as a unitary device or may be temporarily linked together. For example, the camera phone could be a digital camera in which the cellular-communication block 60 is an add-on card or other module, such as a Sprint PCS Wireless Web Modem™ Aircard 510 manufactured by Sierra Wireless for instance. And as another example, the camera phone could be a cell phone, in which the image-capturing block 58 is an add-on module.

The image-capturing block 58 functions to capture an image into the camera phone. As such, the image-capturing block will preferably include features that are commonly found in a digital camera, such as a lens for receiving light that defines the image, a flash for illuminating the scene being photographed, and a mechanism to establish a digital representation of the image. The mechanism may include a CCD or CMOS image sensor array, which resolves the light into pixels, and a digitizer that establishes digital representations of the pixels. The image-capturing block may then work cooperatively with the processor 66, passing an array of the digital pixel representations to the processor for storage in a digital image file. (Alternatively, the image-capturing block could be an optical scanner mechanism or could take some other form.)

Cellular-communication block 60, in turn, preferably functions to establish and engage in communications via RAN 14, in the manner described above. In a preferred embodiment, for instance, the air interface protocol may be CDMA, which is defined by industry standards TIA/EIA/IS-95A and IS-95B and, more recently, TIA/EIA/IS-2000, Rev. A-2 (published April 2002), which are well known and also incorporated herein by reference. The cellular-communication block may comprise a CDMA chipset, such as an MSM series chipset made by Qualcomm Incorporated of San Diego, Calif., as well as an antenna.

User interface block 62, in turn, may include a display (e.g., LCD) for presenting captured digital images, and for presenting text-based and/or graphics-based menus or prompts to users. Additionally, user interface block 62 preferably includes one or more input mechanisms, such as buttons, or a touch-sensitive display.

Location-determination block 64 may comprise a global positioning system (GPS) receiver by which the camera phone can determine its current location (e.g., latitude/longitude coordinates). Alternatively or additionally, location-determination block 64 may comprise means for conventionally communicating with RAN 14 (e.g., pursuant to TIA/EIA/IS-801) so as to determine its current location.

Data storage 68 then serves to store data, such as digital image files as well as logic executable by processor 66 to carry out various functions described herein. As such, data storage 66 may take various forms, in one or more parts. For example, data storage 68 may comprise a storage block resident permanently in the camera phone, which holds program instructions and data defining logic executable by the processor. Alternatively or additionally, data storage 68 may comprise a removable storage medium, such as a Flash memory card for instance, that holds instructions and data.

In the exemplary embodiment, the logic may define a mechanism to allow a user to capture an image. For instance, the logic may cause the image-capturing block 58 to capture an image when a user engages a shutter-release button, places a call to a designated number, or invokes some other function on the camera phone (such as an "emergency-assistance" button for instance), or the logic may cause the image-capturing block 58 to capture an image in response to some other triggering event. The logic may then cause the resulting image to be stored in data storage 58.

Further, the logic may define a mechanism to allow a captured image to be tagged in various ways or stored in various ways, to characterize the image. By way of example, upon capture of an image, the logic may cause the camera phone to record as metadata within the image file an indication of the current time (per a system clock) and/or an indication of the current location of the camera phone (as determined by location-determination block 64, for instance). As another example, when the camera phone is about to transmit an image into the network, the logic may similarly cause the camera phone to record as metadata within the image file an indication of the current time or the current location. As still another example, upon capture of an image and receipt of user instruction to designate the image as a particular type of image (such as if the user directs the camera phone to capture an "emergency-assistance" image for instance), the logic may cause the camera phone to store the image in a folder designated to hold images of that type and/or with a filename indicative of that type.

The logic may also define a mechanism to allow the camera phone to place a voice call. For instance, the logic may cause the cellular-communication block 60 to transmit a call origination message to RAN 14 when a user dials a number (or selects a predefined number, such as from a contact list, or by invoking an "emergency-assistance" button, for instance) and directs the camera phone to initiate a call to that number. In one embodiment, the voice call can be a conventional circuit switched call, where the MSC sets up the call via a trunk connection to the called party. In another embodiment, the voice call can be placed as a voice-over-packet (e.g., voice-over-IP (VoIP)) call, where the camera phone attains packet data connectivity and engages in SIP, H.323 or other signaling to set up an RTP or other session through which the camera phone can exchange voice packets with the called party over a packet-switched network connection. Other mechanisms for placing voice calls, including variations on these mechanisms, are possible as well.

The logic may also define a mechanism to allow the camera phone to send a captured image to network server 16. In one embodiment, for instance, the logic may cause the camera phone to send the image in a digital image file, via a packet-data connection, directly or indirectly to the network server 16. For instance, the camera phone could be programmed with, or could otherwise be privy to, a network address (such as a URL or IP address) of the network server 16, and the camera phone could send the image file in an IP-based message, such as an HTTP PUSH message or an FTP message, to that network address. The camera phone could send the image file directly to the network server 16 in a peer-to-peer IP communication. Alternatively, the camera phone could send the image file to an intermediate entity, such as a photo management platform 50, together with a destination identifier (e.g., network address) of the network server 16, and the intermediate entity could then responsively forward the image file to the network server 16.

The logic could cause the camera phone to send the image file to the network server 16 in response to one or more designated triggering events. By way of example, the logic could cause the camera phone to send the image file to the network server in response to a user instruction provided by user-interface block 62. For instance, the logic may define a menu through which the user can navigate to select an option that instructs the camera phone to send the image file to the network server 16.

As another example, the logic could cause the camera phone to send the image file to the network server 16 in response to the camera phone initiating a call to a particular phone number. As a specific example, the logic could include data that defines one or more phone numbers, such as "911" for instance, and the logic could cause the camera phone to send the image file to the network server whenever the user initiates a call to one of the defined phone numbers.

As still another example, the logic could cause the camera phone to send the image file to the network server 16 in response to a request for the image from the network server or from some other entity. For instance, the logic could define a short messaging service (SMS) client or multimedia messaging service (MMS) client application that is specially configured to detect an SMS or MMS message coded with a predefined code (such as a code requesting a particular image or particular type of image) or originating from a predefined node (such as from the network server), and to respond to the message by sending the image file to the network server 16.

When the logic causes the camera phone to send an image to the network server 16, the logic may cause the camera phone to send a particular image. For example, the logic may cause the camera phone to send any image, or the most recently captured image, that has been tagged as an "emergency-photo" or as some other predefined type of image. As another example, the logic may cause the camera phone to send the most recently captured image, regardless of its characterization. As still another example, the logic may cause the camera phone to send an image designated by the user, such as an image that the user selects through interaction via the user interface block 62, and/or an image that the user has correlated with a particular number being called (and that is stored in data storage in correlation with that number). Other examples are possible as well.

Further, the logic may cause the camera phone to send with the image an identifier that uniquely identifies the camera phone (e.g., the camera phone's directory number, serial number or other identifier) and that may also uniquely identify the image itself. For instance, if the camera phone sends the image in HTTP PUSH message, the camera phone may programmatically include the identifier as a header parameter in the HTTP message (in an XML format. As another example, the camera phone could write the identifier into the digital image file as metadata, so that the identifier accompanies the image when transmitted. Upon receipt of the image and identifier, the network server 16 may then store the image in correlation with the identifier, so that the network server 16 can thereafter send the image to an assistance center in response to a query keyed to the identifier. (Alternatively, the network server may use some other identifier instead.)

Figure 3:
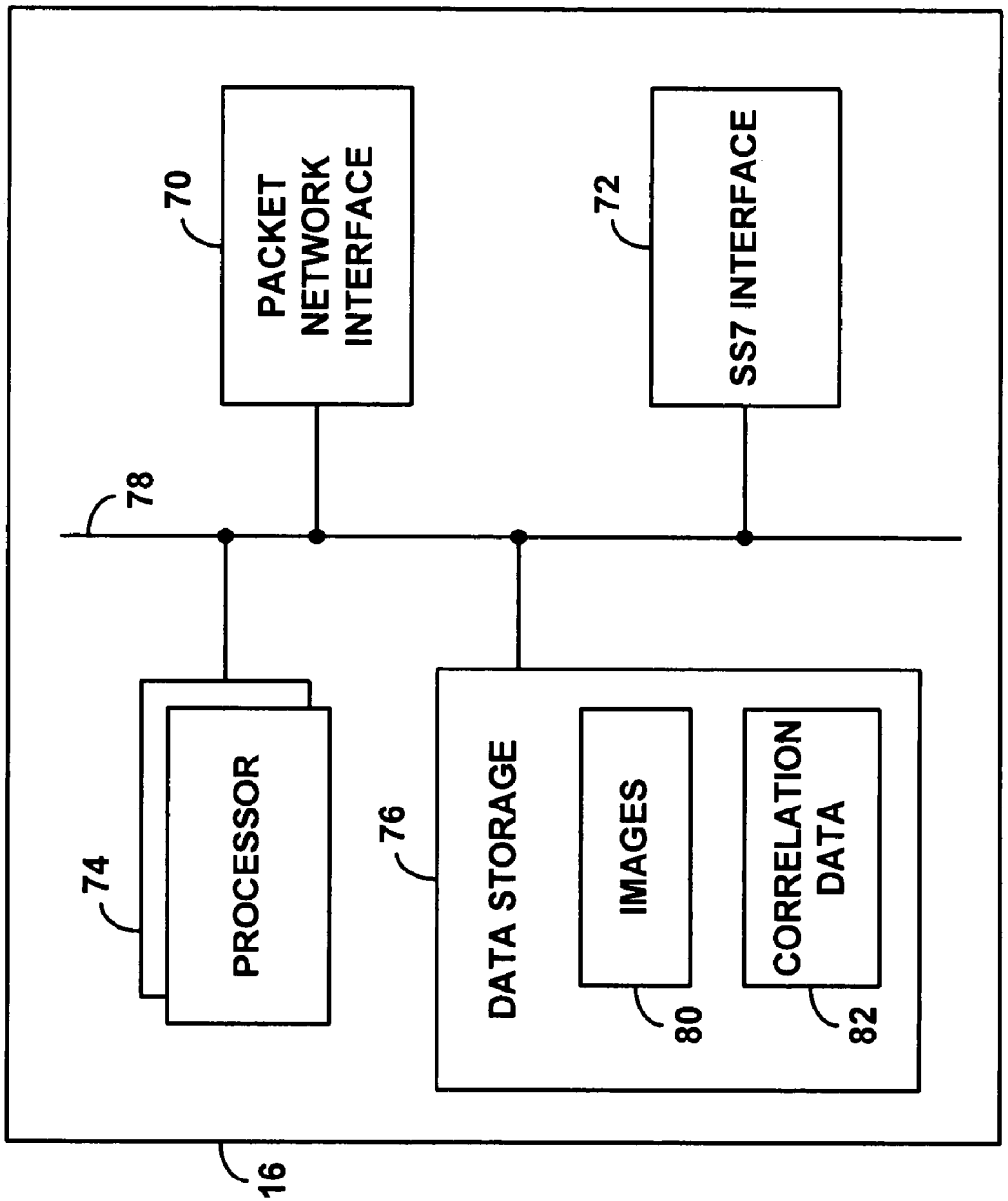
FIG. 3 is a simplified block diagram of a network server arranged to operate within the exemplary embodiment.

FIG. 3 is a simplified block diagram of an example network server 16. As shown in the figure, the example network server includes a packet-data network interface 70, an SS7 interface 72, a processor (i.e., one or more processors) 74, data storage 76, all of which may be coupled together by a system bus, network or other mechanism 78.

Packet-data network interface 74 functions to allow the network server to engage in IP communications on packet-switched network 32 and preferably with packet-gateway 40 of assistance center 18. SS7 interface 76, on the other hand, functions to allow the network server to engage in SS7 communications on signaling network 30.

Data storage 76 preferably holds data and machine language instructions that define logic executable by processor 74 to carry out various functions described herein. For example, as shown in the figure, data storage preferably functions to hold digital images 80 as well as correlation data 82 that correlates each digital image with at least one identifier, such as an identifier of a device (such as a camera phone) that provided the image or an identifier of a call placed by the device (such as a particular call to assistance center 18). The correlation data, for instance, may take the form of a table, in which each record includes an identifier and a full path/filename pointing to a stored digital image in data storage 76.

In the exemplary embodiment, when the network server 16 receives a digital image file transmitted from camera phone 12, the logic on the network server 16 may cause the network server to store the digital image file in data storage 76 in correlation with an identifier. If the network server receives the image file from the camera phone without having requested the image file from the camera phone, the image file would preferably come with an identifier of the camera phone. Thus, the logic would preferably cause the network server to store the image in correlation with that camera phone identifier. On the other hand, if the network server receives the image file from the camera phone in response to a request from the network server, the network server would by definition already know the identifier of the camera phone and could thus store the image in correlation with that identifier or could store the image in correlation with another associated identifier. During setup of a call from the camera phone to the assistance center, the network server could record a correlation between the image and an assistance call identifier (which the network server or other entity could assign).

In addition, when the camera phone places a call that causes MSC to signal up to the network server via signaling network 30, the logic on the network server 16 may cause the network server to acquire an image from the camera phone if it does not already have one, and the logic may cause the network server to respond to the MSC with an identifier of the image. That way, the MSC can then pass that identifier along in call setup signaling to the assistance center 18, and the assistance center 18 can in turn request the stored image from the network server.

For instance, in response to an origination request message from the MSC, the logic may cause the network server to determine whether a digital image from the camera phone is already stored in data storage 76. If so, then the logic may cause the network server 16 to respond to the MSC with a message that conveys an identifier of the stored image, such as an image identifier an identifier of the camera phone (if the image is stored in correlation with the identifier of the camera phone), or a call identifier that the network server or assigns for the particular call. Alternatively, the MSC could assign a call identifier and send it to the network server in its origination request message to the network server, and the network server could correlate the image from the camera phone with that call identifier.

On the other hand, if the network server determines that a digital image from the camera phone is not yet stored in data storage 76, or if otherwise desired, the logic may cause the network server to request an image from the camera phone. For instance, the network server may send an SMS, MMS, WAP push, or other sort of message to the camera phone, which would cause the camera phone to responsively send an image to the network server. The network server may then store the image in correlation with an identifier, such as a camera phone identifier or call identifier. Given an image provided by the camera phone (or work to acquire that image), the logic may then cause the network server 16 to respond to the MSC with a message that conveys the identifier in connection with which the image is stored, unless the MSC has already provided the call identifier.

The logic on the network server also preferably causes the network server to send a given image to assistance center 18 in response to one or more triggering events, such as initiation of a call to the assistance center, or query from the assistance center, keyed to an identifier in correlation with which the image is stored at the network server.

By way of example, the logic may cause the network server to send an image to the assistance center in response to a call being set up to the assistance center. For instance, when the network server receives a signal from the MSC indicating that a call from the camera phone is being set up to assistance center 18, the logic may cause the network server to send to the assistance center an image that the camera phone has provided to the network server. The image could be an image provided to the network server before the camera phone initiated the call to the assistance center or an image provided to the network server in response to a query from the network server as described above. The network server could send the image to the assistance center in an IP-based communication, which packet-gateway 40 would receive and forward to operator terminal 36.

As another example, the logic may cause the network server to send an image to the assistance center in response to a query from the assistance center. Such a query would preferably be keyed to an identifier in connection with which the image is stored at the network server 16, and the query could be sent during call initiation and/or at any time thereafter.

For instance, when the camera phone places a call to the assistance center and the assistance center thus receives the camera phone's phone number as caller-ID information, the assistance center could send a query to the network server seeking an image that is correlated with that calling phone number, and the network server would responsively send to the assistance center an image that was stored in correlation with that phone number.

Alternatively, when the camera phone places a call to the assistance center, which causes the MSC to signal to the network server and receive in response from the network server an image identifier (as described above), the MSC would preferably provide that identifier in a call setup message (e.g., ISUP IAM) to telephony switching node 38 of the assistance center 18. Switching node 38 may then pass that information on to operator terminal 36, which may then send a query to the network server seeking an image that is correlated with that identifier. The network server may then responsively send to the assistance center an image that was stored in correlation with that identifier.

Further, the assistance center, either automatically or at the request of an operator, could make one or more subsequent requests to the network server for an image correlated with a given identifier. For instance, after a user places an emergency assistance call to the assistance center, the assistance center could periodically check with the network server to see if the network server has any emergency-scene photos that the camera phone has captured, and to acquire those emergency-scene photos.

The logic in the network server could further condition its sending of an image to the assistance center on other criteria, such as on location and/or time tags of the image. For example, the logic could cause the network server to send to the assistance an image only if the image was captured within a given past time period (as indicated by capture time metadata in the image file for instance), only if the image was captured at a given location (as indicated by capture location metadata in the image file for instance), such as at the location from which the camera phone initiated the assistance phone call, or only if one or more other criteria are met.

Figure 4:
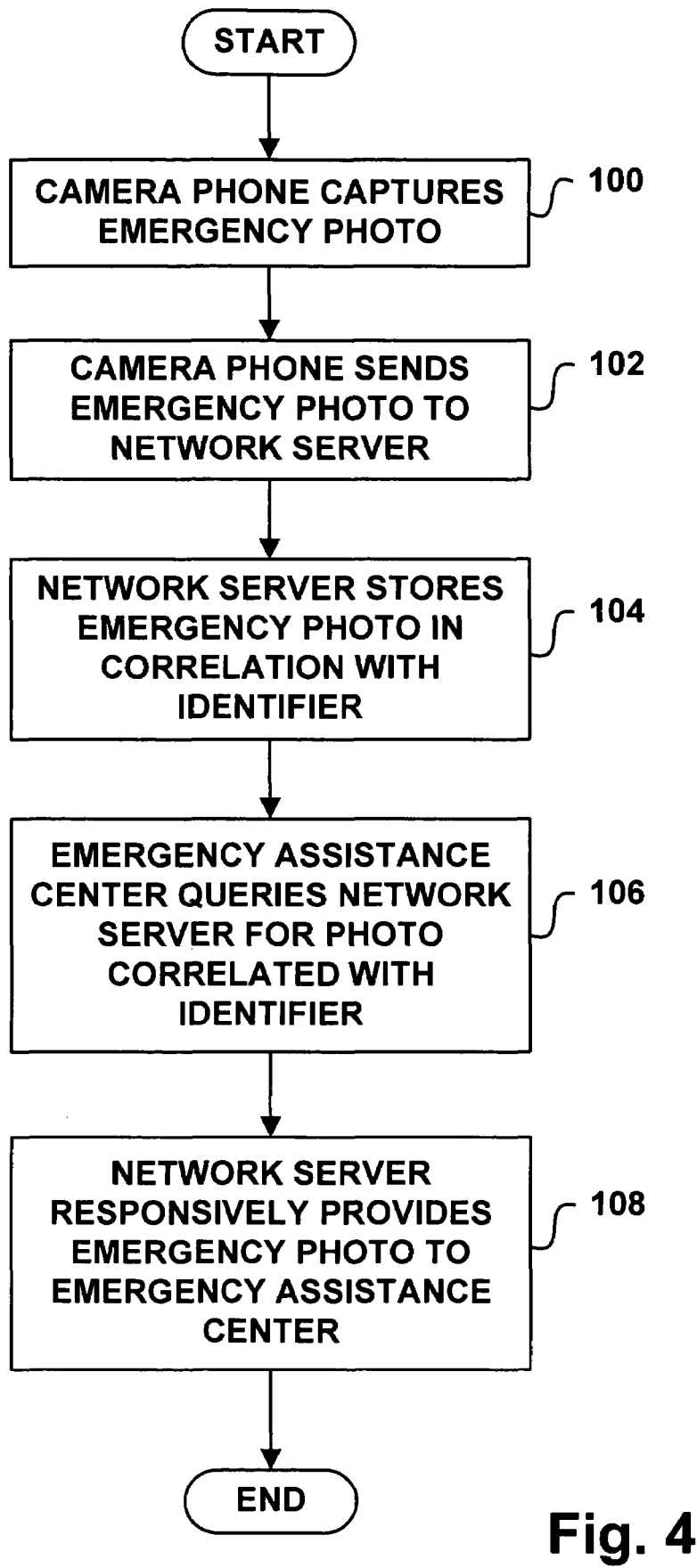
FIG. 4 is a flow chart depicting functions carried out in accordance with the exemplary embodiment.

FIG. 4 is a flow chart, depicting an example set of functions carried out in accordance with the exemplary embodiment. In this figure and in the discussion that follows, the assumption is that the camera phone captures an emergency-scene photo, and that the assistance center is an emergency assistance center such as a 911 center. The functions can be extended, however, to apply in a scenario where the photo represents some other image and where the assistance center is some other sort of assistance center, and with other variations as well.

As shown in FIG. 4, at block 100, the camera phone captures an emergency-photo. At block 102, the camera phone sends the photo to the network server, and, at block 104, the network server stores the photo correlated with an identifier, such as a camera phone ID or an emergency assistance call ID. At block 106, the emergency assistance center queries the network server for emergency photo(s) correlated with the identifier. And at block 108, the network server responsively provides the emergency assistance center with the emergency photo provided by the camera phone. Specific examples of this process will now be described.

EXAMPLE 1

In this first example, assume that a user of a camera phone operates the camera phone to capture an emergency-photo and to send the emergency-photo to the network server. For instance, the user may point the camera phone lens at an emergency scene and engage an emergency-assistance button on the camera phone. This may cause the camera phone to capture an emergency-photo and to store the photo as an emergency scene photo. It may next cause the camera phone to send the emergency-photo to the network server, such as by sending it to the photo management platform with a destination identifier of the network server. In turn, it may cause the camera phone to initiate a 911 call, by dialing the phone number "911".

When the network server receives the emergency photo from the camera phone, the photo would preferably arrive together with a camera phone identifier, such as the directory number of the camera phone. The network server may thus store the photo in correlation with that camera phone identifier.

When the camera phone initiates the 911 call, the MSC may encounter an AIN trigger, which would cause the MSC to send an ORREQ message to the network server, providing the network server with the camera phone's directory number and the called number (911). Given this message, the network server may then look to its data storage for a photo correlated with the camera phone's directory number and would thus retrieve the emergency-photo that the cameraphone had send to the network server. The network server may thus respond with an orreq_rr to the MSC, carrying a parameter that indicates the network server has an emergency-photo for the emergency assistance center.

The MSC will then work to set up the call to the emergency assistance center, such as by sending an ISUP IAM signaling message to the telephony switching node of the assistance center. Conventionally, the IAM message would carry an indication of the calling phone number, i.e., the camera phone's directory number, as caller-ID information. Further, preferably the IAM message would carry the parameter indicating that the network server has the emergency photo for the assistance center.

Thus, upon receipt of the call setup message from the MSC, the emergency assistance center may responsively query the network server to obtain the emergency photo. The query would preferably carry the camera phone's directory number. Upon receipt of the query, the network server would then look to its data storage to find the emergency photo stored in correlation with that number. And the network server would then provide that emergency photo in response to the emergency assistance center, for display or other use.

EXAMPLE 2

In this next example, assume that a user of a camera phone operates the camera phone to capture an emergency-photo and to store the emergency-photo. For instance, the user may capture a photo of an emergency scene and then direct the camera phone to store the photo as an emergency-photo (e.g., by storing the photo with a designated filename or in a designated folder.)

Assume that, shortly thereafter, the user then places a 911 call to report the emergency. Thus, the camera phone may send a call origination message over the air to the MSC, seeking to set up a call to the directory number 911 (or other designated emergency number).

When the MSC receives this call request, the MSC may then encounter an AIN trigger and send an ORREQ to the network server, providing the network server with the calling and called numbers. In response, the network server may look to its data storage and determine that it does not currently have an emergency-photo provided by the camera phone (e.g., a photo correlated with the camera phone's directory number as indicated in the ORREQ message). Thus, the network server may initiate a process of acquiring an emergency-photo from the camera phone.

To acquire an emergency-photo from the camera phone, the network server may, for instance, send to the camera phone an SMS message carrying a special code to which the camera phone is programmed to respond by sending an emergency-photo to the network server. For instance, the specially coded SMS message can carry a URL or other network address of the network server as well as a special code that causes the camera phone to send any (or any recently captured) emergency-photo to the network server. Thus, the camera phone may retrieve the stored emergency-photo from data storage and send it to the network server.

Upon receipt of the emergency-photo from the camera phone, the network server may then store the emergency photo in correlation with an identifier, such as a unique call-identifier that the network server assigns for this call being placed by the camera phone. The network server may then respond with an orreq_rr to the MSC, providing the MSC with the assigned identifier, and instructing the MSC to proceed with setup of the call to the assistance center.

The MSC may then send a call setup message such as an ISUP IAM message to the assistance center, providing the assistance center with the identifier supplied by the network server. Given that identifier, the assistance center may then query the network server to obtain an emergency photo correlated with the identifier. Upon receipt of that query from the assistance center, the network server would thus look to its data storage to find the emergency photo stored in correlation with the identifier, and the network server would send that photo in a response message to the assistance center.

EXAMPLE 3

In another example, assume that a user of the camera phone has called 911, and the emergency assistance center has received an emergency-photo according to the process set forth in either of the examples above. Assume next that the user operates the camera phone to capture one or more other images of the emergency scene, and the user operates the camera phone to send the one or more additional emergency photos to the network server.

In this example, the emergency assistance center can query the network server one or more times after the initial query, to obtain one or more additional emergency photos captured by the camera phone. Each such query could be invoked by an operator at the emergency assistance center, or automatically by equipment at the assistance center.

Preferably, the network server would store each additional emergency photo from the camera phone in correlation with the same identifier that was provided to the assistance center (e.g., the camera phone identifier or call identifier). Thus, when the network server receives additional queries from the assistance center seeking emergency photos correlated with that identifier, the network server can send the appropriate emergency photos in response to the assistance center. In an exemplary embodiment, the network server could be programmed to send any emergency photo that has not yet been sent to the assistance center.

An exemplary embodiment of the present invention has been described above. Those skilled in the art will understand, however, that changes and modifications may be made to this embodiment without departing from the true scope and spirit of the present invention, which is defined by the claims.

For example, where the foregoing description discusses logic in the form of program instructions, it should be understood that the logic could equally take the form of software, firmware and/or hardware. As another example, although the foregoing description discusses sending a given photo to an assistance center, it should be understood that more than one photo could be sent to the assistance center. And as still another example, although the foregoing description focuses on providing images to assistance centers, it should be understood that the invention could be extended to provide photos to other called destinations as well.

Other examples are possible as well.

I claim:

1. A method comprising:

during setup of a call from a camera phone to an assistance center, (i) receiving into a network server a signal indicative of the call being set up, (ii) responsively sending from the network server to the camera phone a request for an image captured by the camera phone, and (iii) receiving the image into the network server;

storing the image at the network server in correlation with an identifier;

during setup of the call from the camera phone to an assistance center, providing the identifier to the assistance center;

receiving into the network server from the assistance center a request specifying the identifier; and using the identifier specified by the request as a basis to retrieve the image and conveying the image in a response from the network server to the assistance center.

2. The method of claim 1, wherein the identifier identifies the camera phone.

3. The method of claim 1, wherein the identifier identifies the call.

4. The method of claim 1, wherein the assistance center is an emergency assistance center.

5. The method of claim 1, wherein the network server resides in a telecom carrier's network.

6. The method of claim 1, wherein the network server comprises one or more computers with data storage for holding the image in correlation with the identifier.

7. The method of claim 1, wherein receiving the image into the network server comprises receiving the image delivered from the camera phone to a network address assigned to the network server.

8. The method of claim 7, wherein the network address comprises an address selected from the group consisting of an Internet Protocol (IP) address, an e-mail address, a Universal Resource Identifier (URI), and a Session Initiation Protocol (SIP) address.

9. The method of claim 1, wherein providing the identifier to the assistance center during setup of the call comprises:
    detecting setup of the call at a switch;
    responsively sending a signaling message from the switch to the network server;
    receiving at the switch a response to the signaling message, wherein the response to the message provides the identifier; and
    sending from the switch a call setup message carrying the identifier.

10. The method of claim 1, wherein the identifier comprises a directory number of the camera phone, and wherein providing the identifier to the assistance center comprises delivering the directory number in call setup messaging as automatic-number-identification information.

11. The method of claim 1, wherein receiving into the network server the request from the assistance center occurs during setup of the call from the camera phone to the assistance center.

12. The method of claim 1, further comprising, after conveying the image from the network server to the assistance center:
    receiving into the network server a subsequent image captured by the camera phone;
    storing the subsequent image at the network server in correlation with the identifier;
    receiving into the network server a subsequent request from the assistance center to obtain at least one image correlated with the identifier; and
    conveying the subsequent image in a response from the network server to the assistance center.

13. A method comprising:
    receiving into a network server an image captured by a camera phone, wherein receiving the image into the network server comprises receiving a digital image file containing data representative of the image and characterizing-metadata;
    storing the image at the network server in correlation with an identifier;
    during setup of a call from the camera phone to an assistance center, providing the identifier to the assistance center;
    receiving into the network server from the assistance center a request specifying the identifier;
    using the identifier specified by the request as a basis to retrieve the image;
    deciding, based at least in part on the characterizing-metadata, whether to send the image from the network server to the assistance center in response to the request; and
    conveying the image in a response from the network server to the assistance center wherein conveying the image in a response from the network server to the assistance center comprises conveying the digital image file in the response.

14. The method of claim 13, wherein the characterizing-metadata defines information selected from the group consisting of (i) image-capture location, (ii) image-capture time, (iii) image-transmit location, and (iv) image-transmit time.

15. A network server comprising:
    a processor;
    data storage; and
    program instructions stored in the data storage and executable by the processor to carry out functions comprising:
        during setup of a call from a camera phone to an assistance center, (i) receiving a signal indicative of the call being set up, (ii) responsively sending to the camera phone a request for an image captured by the camera phone, and (iii) receiving the image captured by a camera phone,
        storing the image in the data storage, in correlation with an identifier,
        during setup of a call from the camera phone to an assistance center, receiving from the assistance center a request specifying the identifier, and
        using the identifier specified by the request as a basis to retrieve the image from the data storage, and sending the image in a response to the assistance center.

16. A method comprising:
    capturing an image into a camera phone;
    conveying the image from the camera phone to a network server;
    storing the image at the network server in correlation with an identifier;
    placing a call from the camera phone to the assistance center, and providing the identifier to the assistance center during setup of the call; and
    conveying a request from the assistance center to the network server to obtain the image, based on the identifier, and conveying the image in a response from the network server to the assistance center, wherein conveying the image from the camera phone to the network server occurs during setup of a call from the camera phone to an assistance center and comprises the network server receiving a signal indicative of the call being set up, and the network server responsively requesting the image from the camera phone.

17. The method of claim 16, wherein the assistance center querying the network server to obtain the image, based on the identifier, occurs during setup of the call.

18. The method of claim 17, wherein the assistance center querying the network server center to obtain the image based on the identifier comprises:
    receiving the identifier at the assistance center; and
    sending a request message from the assistance center to the network server, wherein the request message carries the identifier as a query key.

* * * * *